United States Patent Office 2,788,830
Patented Apr. 16, 1957

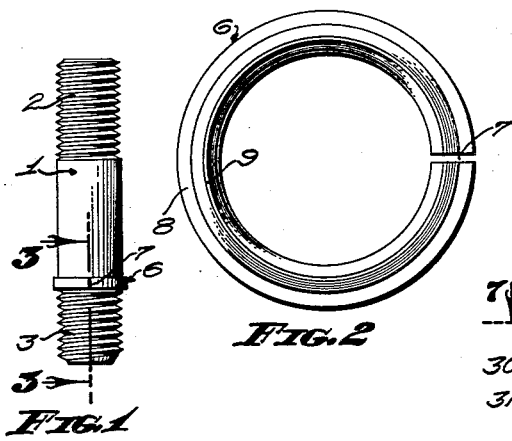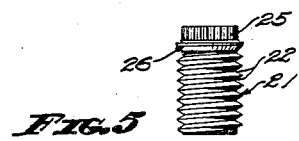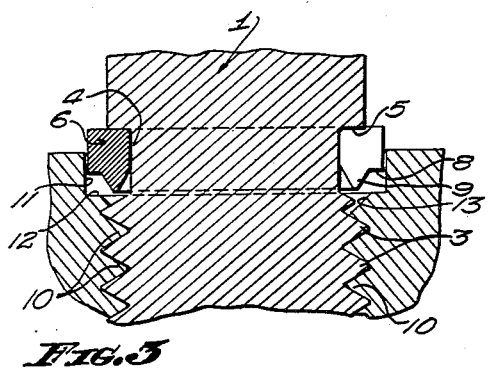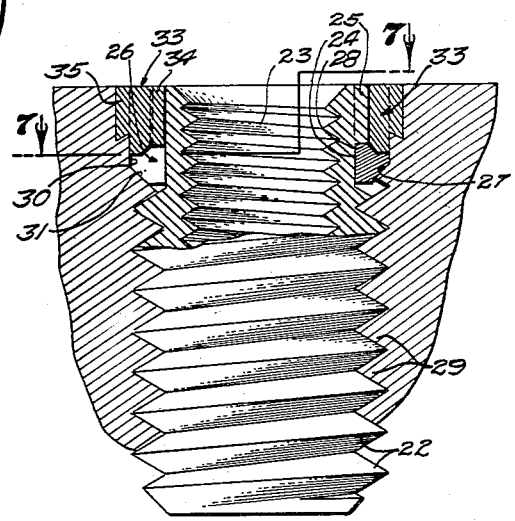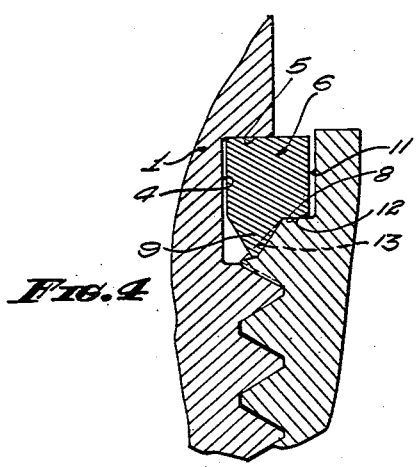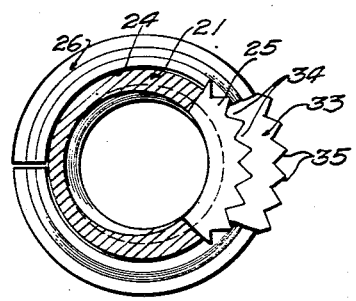

2,788,830

THREADED MOUNTING DEVICE HAVING SPLIT RING INSTALLATION STOP MEANS RETAINED THEREON

Joseph Rosan, Newport Beach, Calif.

Application June 8, 1953, Serial No. 360,063

2 Claims. (Cl. 151—22)

My invention relates to a mounting device with installation stop, and included in the objects of my invention are:

First, to provide a device of this character which may be made in the form of a stud or insert and is so arranged that in the course of installing such stud or insert, particularly with the use of power drive tools or under conditions where speed of installation is of primary importance, the stud or insert is stopped or located at precisely the desired depth with regard to the surface of the work piece in which it is fitted.

Second, to provide a device of this class which includes a screw threaded shank adapted to fit a previously prepared screw threaded socket having a counterbore forming a stop shoulder, and which incorporates a split stop ring arranged to engage the stop shoulder and limit with accuracy the axial position of the device relative to the screw threaded socket.

Third, to provide a device of this character involving a prepared screw threaded socket and mating shank which incorporates a stop collar so arranged as to deform the initial screw thread of the socket and lock the shank in place so that substantially greater force is required to remove the device than is required to install the device.

Other objects and advantages of this invention will be apparent from the following detailed description of a preferred embodiment thereof as illustrated in the accompanying drawings in which:

Figure 1 is an elevational view of my mounting device in the form of a stud and provided with an installation stop ring.

Figure 2 is a plan view of the stop ring.

Figure 3 is an enlarged fragmentary sectional view through 3—3 of Figure 1 showing the stud and stop ring in the course of being fitted into a screw threaded socket.

Figure 4 is a still further enlarged fragmentary sectional view showing the stud and stop ring as they appear when seated in a screw threaded socket and illustrating the manner in which the initial screw thread of the socket is deformed to retain the stud against removal.

Figure 5 is an elevational view of my mounting device in the form of a removable insert.

Figure 6 is a partial longitudinal sectional, partial elevational view of a replaceable insert equipped with an installation stop ring shown fitted in a surrounding body of material.

Figure 7 is a partial elevational, partial sectional view thereof taken through 7—7 of Figure 6 with the surrounding body of material omitted.

Reference is first directed to Figures 1–4.

In the construction here illustrated a stud 1 is provided which includes a central cylindrical portion screw threaded at its extended end as indicated by 2 and at its mounting end as indicated by 3. Between the screw threads 3 and the central section of the stud there is provided a groove 4. The diameter of this stud at the groove 4 is equal to or slightly less than the root diameter of the screw threads 3. The side of the groove 4 remote from the threads 3 forms a shoulder 5. Fitted within the groove 4 is a stop collar 6 which is split as indicated by 7. The stop collar has a flat upper surface adapted to bear against the shoulder 5. The opposite axial end of the collar which confronts the screw threads 3 is provided with a radially outer shoulder portion 8 and a radially inner axially directed annular tooth 9.

The mounting device, as shown in Figure 1, is adapted to fit within a screw threaded socket 10 formed in a body of material. In preparing the socket for reception of the mounting device, the outer end is counterbored, as indicated by 11, so as to form a shoulder 12. Also the region within the axial projection of the screw threads 10 is chamfered as indicated by 13.

When the mounting device is fitted into the screw threads 10 of the socket, the annular tooth 9 bears against the chamfer 13. The radially outer surface of the tooth 9 is so sloped as to form a conical section of lesser internal angle than the conical section defined by the chamfer 13 so that on forcing the collar into the counterbore the annular tooth 9 deforms the chamfer and, consequently, deforms the upper convolution of the screw thread 10 as shown best in Figure 4. Thus, when the shoulder 8 abuts the shoulder 12, as shown in Figure 4, the first convolution of the screw thread 10 is so deformed that the stud is securely retained in place; for example, it has been found that a one-half inch diameter stud may be screw threaded into place with a torque wrench having a 25" lb. torque, but upon attempting to remove the stud, 125" lb. of torque is required to restore the deformed convolution of the screw thread 10 and permit removal of the stud.

It will be observed that the shoulder 12 coacting with the shoulder 8 and that the shoulder 5 coacting with the upper surface of the collar 6 provide an accurate means of setting the stud at exactly the desired depth. This is of primary importance in the mounting of studs in, for example, engine blocks or other structures in which a large number of studs are placed for the attachment of other members. By means of the stop shoulder the studs may be screwed in place with power tools by relatively unskilled workers and yet the studs will be in precisely the desired position; that is, neither too deep nor too shallow.

Reference is now directed to Figures 5–7.

The mounting device here shown involves an adaptation of my 2-piece replaceable insert, such as shown in my previous Patent No. 2,400,318, issued May 14, 1946. The structure here illustrated comprises an insert member 21 having external screw threads 22. The insert may be bored and internally screw threaded as indicated by 23, or may be provided with a stud projecting therefrom.

At one end of the screw threads 22 the insert is provided with a groove 24. Beyond this groove 24 the insert is provided with longitudinal serrations 25. These serrations 25 are within the projected area of the screw threads 22.

Fitted within the channel or groove 24 is a split stop collar 26. The underside of the stop collar facing the screw threads 22 is provided with a beveled face 27, the upper end of the collar may be stepped as indicated by 28. The insert 21 is adapted to fit within a socket having internal screw threads 29. The outer end of the socket is provided with a counterbore 30 joining the screw threads 29 through a beveled shoulder 31. The insert is adapted to be screw threaded into the socket until its beveled face 27 engages the beveled shoulder 31 and positively limits further travel of the insert. With this arrangement an unskilled operator, using either hand or power tools, may quickly drive the insert to its exact position as determined by the collar and beveled shoulder. This is of primary importance for with the type of insert shown it is desirable that the outer end of the insert, or at least the outer extremities of the serrations 25, be substantially flush with the surrounding body of material.

The counterbore 30 is of such dimensions as to receive a locking ring 33 having internal serrations 34 which engage the serrations 25 and external broaching serrations 35 adapted to be forced axially into the surrounding body of material in order to completely immobilize the insert 21.

It will be observed that in both constructions illustrated the stop collar or stop ring is spread and then placed over the mounting device, and then permitted to snap into the groove provided therefor. The accuracy with which the stud 1 or insert 21 may be positioned in a work piece is determined by the accuracy with which the stop ring receiving groove is formed in the stud or insert and the accuracy with which the shoulder 12 or 31 is formed in the work piece. As to the lock ring receiving groove, this can be readily formed by automatic machinery to very close tolerances. Similarly, by use of simple stops the counterboring of the screw threaded socket may be maintained at precisely the desired depth. As a consequence the stud or insert may be accurately located with a minimum of difficulty and without special attention on the part of the operator.

It should be observed that in threading the socket to receive the stud or insert, it is impossible to control both the drilling and screw threading so that the stud or insert will bottom in such socket at the desired depth; hence, without the position-determining stop ring, the stud or insert cannot be easily set at precisely the desired depth.

Having fully described my invention, it is to be understood that I do not wish to be limited to the details herein set forth, but my invention is of the full scope of the appended claims.

I claim:

1. A mounting device adapted for screwthread insertion in a socket having a counterbore and shoulder, comprising: a shank having a screwthreaded section and a groove at the axially inner end of said section forming an abutment shoulder at its margin remote from said screwthreaded section; and a split ring formed of material resistant to axial deformation, said ring fitting said groove and engageable with said abutment shoulder and said socket shoulder to limit screwthreaded insertion of said shank into said socket; the axial end of said ring confronting said screwthreads having a beveled rib engageable with the initial screwthread of said socket as said ring is immobilized between said abutment shoulder and socket shoulder to deform said initial screwthread, thereby tending to lock said shank against subsequent removal.

2. A mounting device adapted for screwthread insertion in a socket having a counterbore and shoulder, comprising: a shank having a screwthreaded section and a groove at the axially inner end of said section forming an abutment shoulder at its margin remote from said screwthreaded section; a split ring formed of material resistant to axial deformation, said ring being journaled in said groove, one axial end engageable with said abutment shoulder, the other axial end engageable with the shoulder within said socket to immobilize said ring and limit penetration of said shank into said socket; the axial end of said ring confronting said screwthreads having a beveled rib engageable with the initial screwthread of said socket as said ring is immobilized between said abutment shoulder and socket shoulder to deform said initial screwthread, thereby tending to lock said shank against subsequent removal.

References Cited in the file of this patent

UNITED STATES PATENTS

| | | |
|---|---|---|
| 1,299,691 | Dery | Apr. 8, 1919 |
| 2,177,452 | Dempsey | Oct. 24, 1939 |
| 2,400,318 | Rosan | May 14, 1946 |
| 2,405,402 | Carter | Aug. 6, 1946 |
| 2,407,741 | Goodby | Sept. 17, 1946 |
| 2,452,262 | Rosan | Oct. 26, 1948 |
| 2,550,867 | Rosan | May 1, 1951 |